United States Patent Office 3,369,026
Patented Feb. 13, 1968

3,369,026
PROCESS FOR PREPARING GAMMA-METHYL GLUTAMATE N-CARBOXY ANHYDRIDE
Makoto Iwatsuki, 4530, Kamidono-cho Daishingawara, Kawasaki-shi, Kanagawa-ken, Shigeo Mori, 1413, 1-chome, Himonya Meguro-ku, Tokyo, and Setsuji Sakurai, 6810, Nakaoka, Kugenuma, Fujisawa-shi, Kanagawa-ken, Japan
No Drawing. Continuation-in-part of application Ser. No. 560,993, July 28, 1966. This application Dec. 12, 1966, Ser. No. 600,774
Claims priority, application Japan, July 23, 1963, 38/39,331
13 Claims. (Cl. 260—307)

ABSTRACT OF THE DISCLOSURE

When γ-methyl glutamate hydrochloride contaminated with glutamic acid hydrochloride is contacted with phosgene in a high-boiling aliphatic hydrocarbon, the γ-methyl glutamate hydrochloride is substantially completely converted to γ-methyl glutamate N-carboxyanhydride which dissolves in the solvent, whereas the glutamic acid hydrochloride does not react and is insoluble in the solvent from which it is readily separated.

---

This application is a continuation-in-part of our co-pending application Ser. No. 560,933, filed June 28, 1966, now abandoned, which itself is a continuation-in-part of our abandoned copending application Ser. No. 384,234, filed July 21, 1964.

This invention relates to a process for preparing γ-methyl glutamate N-carboxy anhydride having the formula

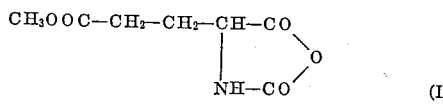

and being referred to hereinafter as "Compound I."

Compound I is useful for making poly-γ-methyl glutamate from which fibers, molding resins, and films can be made.

As shown in British Patents Nos. 864,692 and 935,396, fibers or films of poly-γ-methyl glutamate may be prepared by polymerizing Compound I in halogenated hydrocarbon solvents and then to use the resultant polymer solution directly as a dope for spinning or in the preparation of film. The physical properties of the poly-γ-methyl glutamate solution are critically important for economical production of fibers and films on an industrial scale.

Compound I can be prepared by reacting γ-methyl glutamate or γ-methyl glutamate hydrochloride with phosgene in dioxane or ethyl acetate in which Compound 1 is highly soluble.

The reaction proceeds in steps approximately shown below:

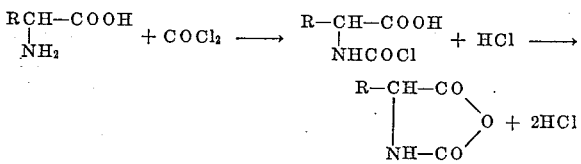

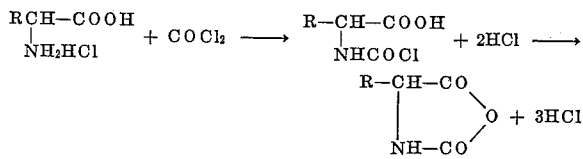

wherein R is $CH_3OOC-CH_2-CH_2-$.

In addition to Compound I, acid chloride derivatives II and III are formed as by-product, as described in British Patent No. 854,140 and U.S. Patent No. 3,184,469.

The quality of the polymer produced from compound I is known to be directly related to the purity of the monomer, and the chlorine content of Compound I has been considered heretofore to be a criterion of its purity because more than 0.03% chlorine interferes with full polymerization of Compound I.

However, we have now found that a Compound I merely free from chlorine may not yield poly-γ-methyl glutamate having the desired physical properties for making fibers and films, and that free glutamic acid present in the γ-methyl glutamate from which Compound I is prepared may cause formation of a impurity which cannot be removed from Compound I by recrystallization and strongly inhibits polymerization.

The effects of the impurity derived from glutamic acid or its hydrochloride present in the initial γ-methyl glutamate or its hydrochloride on the polymerization of the Compound I are illustrated in Tables I and II.

TABLE I

| Run No. | Degree of Polymerization | Conversion Percent | Viscosity Poise | Spinability | Filterability |
|---|---|---|---|---|---|
| 1 | 6,200 | 96.2 | 260 | 120 | 20 |
| 2 | 4,600 | 95.8 | 240 | 145 | 25 |
| 3 | 3,500 | 94.5 | 250 | 110 | 20 |
| 4 | 3,300 | 88.1 | 380 | 75 | 175 |
| 5 | 3,300 | 89.0 | 330 | 80 | 188 |
| 6 | 3,000 | 73.2 | 400 | 55 | 357 |
| 7 | 2,600 | 75.4 | 520 | 20 | 720 |
| 8 | 2,400 | 53.3 | 700 | 5 | 1,050 |
| 9 | 2,000 | 26.1 | 50 | 3 | 930 |
| 10 | 4,200 | 93.5 | 250 | 115 | 25 |
| 11 | 3,200 | 89.6 | 320 | 80 | 90 |
| 12 | 2,100 | 30.0 | 40 | 1 | 1,130 |
| 13 | 4,500 | 96.0 | 250 | 130 | 25 |
| 14 | 2,800 | 78.5 | 480 | 35 | 640 |
| 15 | 2,500 | 61.0 | 630 | 10 | 970 |

TABLE II

| Run No. | Degree of Polymerization | Conversion Percent | Viscosity Poise | Spinability | Filterability |
|---|---|---|---|---|---|
| 1 | 3,600 | 95.5 | 150 | 60 | 15 |
| 2 | 3,200 | 94.8 | 140 | 70 | 20 |
| 3 | 2,600 | 95.7 | 100 | 55 | 75 |
| 4 | 2,100 | 90.2 | 70 | 20 | 152 |
| 5 | 2,030 | 87.4 | 75 | 35 | 184 |
| 6 | 1,900 | 88.3 | 50 | 7 | 481 |
| 7 | 1,400 | 80.1 | 40 | 10 | 467 |
| 8 | 700 | 61.9 | 20 | 2 | 924 |
| 9 | --- | 0 | --- | --- | --- |
| 10 | 3,300 | 95.6 | 130 | 75 | 31 |
| 11 | 2,000 | 88.3 | 75 | 25 | 220 |
| 12 | --- | 0 | --- | --- | --- |
| 13 | 3,800 | 96.0 | 175 | 65 | 30 |
| 14 | 1,600 | 85.8 | 60 | 15 | 526 |
| 15 | 1,000 | 75.0 | 25 | 1 | 748 |

γ-Methyl glutamate or its hydrochloride containing an amount of glutamic acid or its hydrochloride as listed in Table III was reacted with phosgene in the usual manner in a dioxane medium (Runs 1 to 9 and 13 to 15) or in an ethyl acetate medium (Runs 10 to 12). The reaction mixture was partly evaporated under reduced pressure to remove the solvent, and crystalline Compound I was precipitated from the concentrate by the addition of a mixture of chloroform and petroleum ether (Runs 1 to 12) or by addition of 1,2-dichloroethane (Runs 13 to 15). The crystals were purified by dissolution in dioxane and precipitation with chloroform and petroleum ether (Runs to 12), or by recrystallization from 1,2-dichloroethane (Runs 13 to 15) until their chlorine content was less than 0.01 percent.

Triethylamine was employed as the polymerization initiator, and the polymerization medium was a mixture of one part dioxane and two parts chloroform in the runs of Table I, and methylene chloride in the runs of Table II.

The same batch of pure γ-methyl glutamate or γ-methyl glutamate hydrochloride was employed in correspondingly numbered runs whose results are listed in the two tables, and glutamic acid or its hydrochloride was added as listed in Table III.

TABLE III

| Run No. | Main Constituent | Glutamic Acid Content Percent |
|---|---|---|
| 1 | Methyl glutamate | 0.12 |
| 2 | do | 0.25 |
| 3 | do | 0.30 |
| 4 | Me-glutamate hydrochloride | *0.39 |
| 5 | Methyl glutamate | 0.40 |
| 6 | Me-glutamate hydrochloride | *0.52 |
| 7 | do | *0.60 |
| 8 | do | *1.00 |
| 9 | do | *10.30 |
| 10 | Methyl glutamate | 0.25 |
| 11 | Me-glutamate hydrochloride | *0.39 |
| 12 | do | *10.30 |
| 13 | Methyl glutamate | 0.20 |
| 14 | Me-glutamate hydrochloride | *0.60 |
| 15 | do | *1.00 |

*Glutamic acid hydrochloride.

The "glutamic acid content" is expressed in percent of the combined weight of γ-methyl glutamate and glutamic acid (or of γ-methyl glutamate hydrochloride and glutamic acid hydrochloride). The free acid was determined by assay with glutamic acid decarboxylase and the barometric method of Warburg.

The listed values of degree of polymerization were calculated from the intrinsic viscosities of solutions in dichloroacetic acid. "Conversion" was determined five hours after initiation of the polymerization by titration of the polymer solution with sodium methylate. The "spinnability" values indicate the distance in centimeter over which the polymer solution fell when extruded from an orifice of 0.3 mm. diameter under a pressure of 3 kg./cm.$^2$. The "filterability" was calculated from the equation $$\frac{2 - W_2 W_1}{W_1 + W_2} \times 100,000$$

wherein $W_1$ is the amount of filtrate collected after 20 minutes, and $W_2$ is the amount of filtrate collected during the next 40 minutes when a polymer solution was forced through a standard filter under a pressure of 2 kg./cm.$^2$.

The polymer solutions obtained in Runs Nos. 1–3, 10 and 13 in both solvents (Tables I and II) were transparent and yielded excellent fibers and films. The polymer solutions of Runs Nos. 4, 5, 11 and 14 showed slight white turbidity, and those of Runs Nos. 6–9, 12 and 15 were quite strongly turbid. Good fibers and films could not be obtained from the turbid solutions.

The Tables I and II largely speak for themselves.

The tabulated results show that a good polymer cannot be obtained from Compound I prepared from a γ-methyl glutamate (or its hydrochloride) containing more than 0.3% glutamic acid (or its hydrochloride) even when the chlorine content of the Compound I is reduced to less than 0.01% by recrystallization.

A. C. Farthing (J. Chem. Soc., 3216 (1950)) tried to prepare glutamic acid N-carboxyanhydride by treatment of glutamic acid with phosgene in dioxane, and the reaction product gave only tarry matter when subjected to the usual polymerization procedure. It would be expected that glutamic acid N-carboxyanhydride IV inhibits the polymerization of γ-methyl glutamate by means of a basic initiator since it has a free carboxyl group.

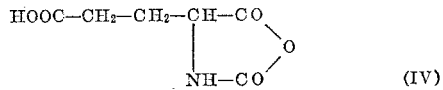

(IV)

The assumption that glutamic acid N-carboxyanhydride interferes with polymerization of Compound I is strongly supported by the following experiments:

400 g. γ-methyl glutamate containing 0.1% glutamic acid were refluxed with 500 g. phosgene in four liters dioxane at 85° C. for one hour. The syrupy residue obtained after removal of excess phosgene and solvent was mixed with 2 liters 1,2-dichloroethane and cooled. 412 g. Compound I were obtained thereby (yield 89%, chlorine content 0.24%).

A glutamic acid N-carboxyanhydride solution was prepared by the method of Farthing: 15 g. glutamic acid were refluxed with 50 g. phosgene in one liter dioxane at 85° C. for one hour. The syrupy residue (20 g.) obtained by the complete removal of the solvent and of unreacted phosgene and consisting essentially of glutamic acid N-carboxyanhydride was diluted to 100 ml. with 1,2-dichloroethane.

Four 100 g. batches of the Compound I prepared as described above were respectively combined with 0, 4, 8, 20 ml. of the glutamic acid N-carboxyanhydride solution, and portions of each mixture were recrystallized once, twice, and three times respectively from 1,2-dichloroethane by the method of U.S. Patent No. 3,184,469 (Example 1). The chlorine content was 0.02% or less after the first recrystallization, and about 0.01% after the second and third recrystallizations.

20 g. samples of the twelve lots of monomer so obtained were each suspended in 100 ml. methylene dichloride and polymerization at 25° C. was initiated by addition of 0.01 g. triethylamine. The conversion was determined after 5 and after 24 hours, and the polymer solution was tested for its physical properties after 24 hours. Transmittance was measured in percent of the transmittance of 1,2-dichloroethane at 750 mμ, and the definitions of Tables I and II are otherwise applicable to Table IV which lists the properties of the twelve polymer solutions obtained.

The monomers employed are identified in Table IV by the following letter symbols: A=no glutamic acid N-carboxyanhydride (GA–NCA) added per 100 g. Compound I; B=4 ml. GA–NCA solution added; C=8 ml. GA–NCA solution added; D=20 ml. GA–NCA added. Numerals after the letter symbols indicate the number of recrystallizations undergone by the monomer.

TABLE IV

| Monomer | Polymer | | | | | | |
|---|---|---|---|---|---|---|---|
| | Conversion | | Degree of Polymerization | Viscosity (poise) | Spinability | Transmittance | Filterability |
| | 5 hrs. | 24 hrs. | | | | | |
| A1 | 96.5 | 95.8 | 3,500 | 150 | 70 | 100 | |
| A2 | 97.5 | 98.0 | 3,300 | 150 | 80 | 100 | 12 |
| A3 | 95.8 | 98.5 | 3,600 | 160 | 75 | 100 | 7 |
| B1 | 88.1 | 93.0 | 2,000 | 100 | 20 | 85 | 406 |
| B2 | 89.0 | 93.8 | 2,100 | 70 | 35 | 83 | 413 |
| B3 | 89.8 | 94.0 | 1,900 | 75 | 25 | 86 | 420 |
| C1 | 79.1 | 88.0 | 1,200 | 20 | 2 | 72 | 870 |
| C2 | 78.5 | 87.5 | 800 | 17 | 1 | 74 | 894 |
| C3 | 79.0 | 87.8 | 1,100 | 23 | 2 | 72 | 910 |
| D1 | 73.5 | 85.8 | 700 | 14 | 0.5 | 59 | 1,250 |
| D2 | 74.8 | 86.2 | 750 | 16 | 1 | 65 | 1,040 |
| D3 | 74.0 | 85.0 | 700 | 13 | 1 | 63 | 1,130 |

The three polymer solutions obtained from Compound I, not contaminated with GA–NCA, were fully transparent and had the desired low fluidity for spinning. The polymer solutions obtained from Batch B were turbid, and those from Batches C and D showed significant gel formation together with turbidity. The effects of repeated recrystallization from 1,2-dichloroethane were not significant as compared to the effects of contamination with GA–NCA.

We have found that glutamic acid or its hydrochloride are present in methyl glutamate or its hydrochlorides when the ester is prepared by any one of the conventional methods disclosed in "Methods in Enzymology," vol. III, p. 547 (Academic Press Inc., New York, 1957); in Z. physiol. Chem. 221 (1933) 53; or J. Chem. Soc. (Japan) 74 (1953) 829. Crude crystals of γ-methyl glutamate contain 0.6–0.7% of the free acid, and this amount is reduced only to 0.2–0.4% by recrystallization from water-methanol. γ-Methyl glutamate hydrochloride contains an average of 1.5% glutamic acid hydrochloride when first precipitated in crystalline form, and this amount is not reduced to less than 1.0% by recrystallization from methanol ether.

The finding that methyl glutamate hydrochloride contains a relatively large amount of the glutamic acid hydrochloride is particularly significant in view of the advantages of the hydrochloride over the free ester. γ-Methyl glutamate cannot be crystallized from an acidic esterification mixture without the use of a relatively costly neutralizing agent, such as triethylamine, and cannot be reacted with phosgene without careful drying to remove methanol. γ-Methyl glutamate, therefore, has not been used on an industrial scale in the manufacture of polymeric materials, and large scale polymerization processes have been based exclusively on the hydrochloride. A γ-methyl glutamate hydrochloride containing less than 0.3% glutamic acid hydrochloride was not available heretofore.

We now have developed a method which permits γ-methyl glutamate hydrochloride to be reacted with phosgene to form Compound I without simultaneously converting the glutamic acid hydrochloride present in the ester starting material to the glutamic acid N-carboxyanhydride. Our method relies on the use of a solvent medium in which glutamic acid hydrochloride is practically inert to phosgene under the reaction conditions, whereas the reaction between γ-methyl glutamate and phosgene proceeds at an adequate rate.

Solvents which meet these two requirements include the halogenated aliphatic hydrocarbons. The formation of Compound I is relatively slow at temperatures lower than about 60° C., and we therefore prefer those chlorinated aliphatic hydrocarbons which are liquid at room temperature, and whose boiling point is at least 70° C. so that the reaction may be performed quickly at atmospheric pressure. The preferred solvents include 1,2-dichloroethane, trichloroethylene, 1,1,2-trichloroethane, tetrachloroethane, pentachloroethane, 1,2-dichloropropane, and 1,3-dichloropropane, and the reaction is preferably performed at a temperature between 60° C. and 95° C. It is preferably 70°–80° C. for a 1,2-dichloroethane medium, 75°–85° C. for 1,2-dichloropropane, and 80°–90° C. for tetrachloroethane.

When methylene chloride or chloroform are employed as solvent media, glutamic acid hydrochloride does not react with phosgene under refluxing conditions while the reaction of the methyl glutamate hydrochloride proceeds at a rate consistent with the low boiling point of the solvent. This rate is normally too low for industrial application, and the low-boiling aliphatic chlorinated solvents, while operative to some extent in the method of our invention, are inferior to the afore-mentioned higher boiling homologs and analogs.

Many solvents heretofore recommended for the recrystallization of Compound I are not suitable in our method. Glutamic acid hydrochloride reacts with phosgene at about the same rate as γ-methyl glutamate hydrochloride in such solvent media as benzene, ethyl acetate, dichlorobenzene, and only a contaminated Compound I can be prepared in such media if the γ-methyl glutamate hydrochloride employed as a starting material was contaminated with at least 0.3% glutamic acid hydrochloride. Closely similar unfavorable results are obtained with mixtures of dimethylformamide and chloroform (see Brit. Pat. 854,140) or of ethyl acetate and petroleum ether (J.A. C.S. 82 (1960) 1630).

When the chlorinated aliphatic hydrocarbons are employed as reaction media, the reaction between the γ-methyl glutamate hydrochloride and phosgene goes to completion, and the glutamic acid hydrochloride originally present is recovered intact as a solid residue from the solution of Compound I in the solvent. The result is not affected by the amount of glutamic acid hydrochloride originally present in the ester. The contaminant may be present originally in an amount of 0.3% or 10%. The glutamic acid hydrochloride does not react with the phosgene at 50° C. nor at 85° C., not in one hour nor in eight hours at a reaction temperature suitable for conversion of the ester to the N-carboxy anhydride.

In carrying out the process of our invention, we react phosgene with a suspension of a preferably equimolecular amount of γ-methyl glutamate hydrochloride containing the unavoidable amount of glutamic acid hydrochloride in one of the afore-mentioned halogenated solvents. Other ratios of phosgene and γ-methyl glutamate hydrochloride, however, may also be employed. Adequate results are obtained if the reaction mixture is held between 60° C. and 95° C., but a narrower range of 70° to 90° C. gives best results. The preferred reaction time is limited by the appearance of colored by-products, and is usually 1 to 2 hours.

The unreacted phosgene is removed and the unreacted starting material, which includes practically the entire glutamic acid hydrochloride, is separated by filtration or otherwise from the resulting solution of Compound I. The filtrate is partly evaporated, and crude Compound I may then be crystallized by cooling the concentrate. A non solvent such as methylene chloride, chloroform, benzene, or chlorobenzene may also be added to the concentrate to precipitate Compound I. The crystals separated from the mother liquor by filtration may be employed for polymerization without further purification, or they may be recrystallized in a manner well known in itself.

If γ-methyl glutamate hydrochloride is obtained from the esterification of glutamic acid as a suspension in a halogenated hydrocarbon, separation of γ-methyl glutamate hydrochloride from the esterification mixture is unnecessary. The α-γ-dimethyl glutamate hydrochloride, which is a by-product of the esterification of glutamic acid, remains in the mother liquor after crystallization of Compound I, and it does not affect the yield nor the physical properties of Compound I.

The following examples are further illustrative of the present invention, and it will be understood that the invention is not limited thereto.

Example I 100 grams γ-methyl glutamate hydrochloride containing 1.0 g. glutamic acid hydrochloride as an impurity were suspended in 500 milliliters tetrachloroethane. 50 grams phosgene dissolved in 750 ml. of the same solvent were added, and the mixture was refluxed at 85° C. for 60 minutes. The excess phosgene was then removed by passing dry nitrogen through the mixture, and the reaction subsided.

The residual liquid and solids were separated by filtration at 25° C., and the filtrate was evaporated to 200 ml. in a vacuum. The concentrate obtained was cooled to 5° C., and 400 ml. methylene chloride were added to induce crystallization. The crystals were filtered off after two hours and dried. They weighed 77 grams.

The unreacted solid material recovered from the reaction mixture weighed 5.1 g., and contained 0.98 g. glutamic acid hydrochloride, as determined by Warburg assay with glutamic acid decarboxylase. The conversion of γ-methyl glutamate hydrochloride, therefore, was 96%, and the yield of crude Compound I was 86%.

Example II

When the procedure of Example I was repeated with 100 g. of a γ-methyl glutamate hydrochloride containing 2% glutamic acid hydrochloride, there were obtained 69.5% of crude Compound I in crystalline form.

The unreacted residue weighed 11.3 g., and contained 1.96 g. glutamic acid hydrochloride. The conversion rate of methyl glutamate hydrochloride thus was 90%, and the yield of Compound I was 83%.

Starting materials containing 5.0 and 10.0 grams glutamic acid hydrochloride in mixtures with γ-methyl glutamate hydrochloride which weighed 100 grams, gave conversion rates of 90% and 91% respectively, and yields of 85%.

Example III

A solution of 50 g. phosgene in 750 ml. 1,2-dichloroethane was slowly admixed to a suspension of 100 g. γ-methyl glutamate hydrochloride containing 1.0 g. glutamic acid hydrochoride as an impurity in 500 milliliters 1,2-dichloroethane at 70° C. and the mixture was kept at that temperature for 120 minutes while escape of phosgene was prevented by a reflux condenser. The excess phosgene was then removed by purging with a stream of dry nitrogen, and the liquid and solids in the residual reaction mixture were separated by filtration while still hot.

The filtrate was concentrated in a vacuum to 45 ml. and coded to 5° C., to induce crystallization of Compound I. The crystals were filtered off after two hours and weighed 82.5 g. after drying.

The unreacted solids weighed 3.9 g., and contained 0.97 g. glutamic acid hydrochloride. The conversion of γ-methyl glutamate hydrochloride was 97%, and the yield of crude Compound I was 91%.

When mixtures of γ-methyl glutamate hydrochloride with 2%, 5%, 10% glutamic acid hydrochloride were subjected to the same sequence of operations, there were respectively obtained 70.2 g., 78.7 g., and 72.5 g. of crude crystalline Compound I. The total unreacted solids weighed 16.5 g., 8.1 g., 15.5 g., and contained 1.96 g., 4.90 g. and 9.90 g. glutamic acid hydrochloride as determined by Warburg assay with glutamic acid decarboxylase. Therefore, the conversion rates of γ-methyl glutamate hydrochloride were 85, 97, and 94%, and yields of Compound I were 89, 90, and 91%.

Example IV

The procedure of Example III was repeated, using as a starting material γ-methyl glutamate containing 10% glutamic acid as an impurity. The yield of crude Compound I was 80.2 g. The unreacted solids were converted to the hydrochlorides which weighed 21.4 g. and included 12.2 g. glutamic acid hydrochloride. The conversion of γ-methyl glutamate thus was 92%, and the yield of crude Compound I was 88%.

Example V 184 grams glutamic acid hydrochloride were added to 400 ml. methanol containing 3.8 g. hydrogen chloride as an esterification catalyst, and the mixture was agitated at 30° C. for two hours, whereby the glutamic acid hydrochloride was taken up in the liquid.

One liter tetrachloroethane was added to the esterification mixture, and methanol and the water formed were slowly evaporated in a vacuum until the water content of the residue was less than 0.3 mg./ml. (three hours). A slurry of crystals and liquid had formed. The crystals consisted of 189 g. γ-methyl glutamate hydrochloride and 4.6 g. glutamic acid hydrochloride, and the liquid contained 4.2 g. dimethylglutamate hydrochloride, as determined by Warburg assay and Kjeldahl analysis.

The slurry was mixed at 80° C. with a solution of 120 g. phosgene in one liter tetrachloroethane. After 90 minutes, the residual phosgene was removed by a stream of dry nitrogen, and the reaction was stopped thereby. The unreacted solids were separated while still hot from liquid in the mixture, and the liquid was concentrated in a vacuum to 400 ml. 800 ml. methylene chloride were added. On cooling to 5° C., crystallization started and was permitted to proceed for two hours, whereupon the crystals were separated from the mother liquor by filtration, and dried. They weighed 138.6 g. and consisted of crude Compound I.

The unreacted residue weighed 20.8 g., and was found to contain 4.55 g. glutamic acid hydrochloride. The conversion of γ-methyl glutamate hydrochloride thus was 91%, and the yield of crude Compound I was 74%, as based on the glutamic acid hydrochloride used, and 85% as based on the γ-methyl glutamate hydrochloride consumed.

Example VI

A solution of 50 g. phosgene in 750 ml. 1,1,2-trichloroethane was poured into a suspension of 100 g. γ-methyl glutamate hydrochloride (including 10 g. glutamic acid hydrochloride) in 750 ml. of 1,1,2-trichloroethane at 85° C., and the reaction mixture was maintained at 85° C. for 90 minutes while escape of phosgene was prevented by a reflux condenser.

The excess of phosgene was then driven off by passing dry nitrogen through the reaction mixture, and the residue was filtered while still hot. The filtrate was concentrated in a vacuum to 300 ml. and cooled to 5° C., whereby crystallization was induced. The crystals of crude Compound I formed were collected by filtration after two hours and weighed 65.6 g.

The unreacted solids weighed 22.5 g., and were found to contain 9.86 g. glutamic acid hydrochloride. The conversion of γ-methyl glutamate hydrochloride thus was 86%, and the yield of crude Compound I, based on the γ-methyl glutamate consumed, was 90%.

*Example VII*

A solution of 50 g. phosgene in 500 milliliters 1,2-dichloropropane was poured into a suspension of 100 g. γ-methyl glutamate hydrochloride containing 1.5 g. glutamic acid hydrochloride as an impurity in 500 milliliters 1,2-dichloropropane at 80° C., and the mixture was kept at that temperature for 60 minutes while escape of phosgene was prevented by a reflux condenser. The excess phosgene was then removed by purging with a stream of dry nitrogen, and the liquid and solids in the residual reaction mixture were separated by filtration while still hot.

The filtrate was concentrated in a vacuum to 200 milliliters and cooled at 3° C. to induce crystallization of Compound I. The crystals were filtered off after two hours and weighed 72.9 g.

The unreacted solids weighed 9.35 g. and were found to contain 1.47 g. glumatic acid hydrochloride.

The conversion of γ-methyl glutamate hydrochloride, therefore, was 92%, and the yield of crude Compound I, based on the γ-methyl glutamate hydrochloride consumed, was 85%.

*Example VIII*

The several batches of Compound I produced as described in Examples I to VII were converted to a polymer spinning solution as follows:

The crystals of crude Compound I were dried in a vacuum at 10° C. Fifty grams of the dried material were dissolved in dioxane. 150 ml. chloroform and 150 ml. petroleum ether were added to the solution in that order. Crystallization was induced by cooling at 5° C. The recrystallized material was filtered from the mother liquor after three hours, washed twice with 50 ml. methylene chloride, and dried in a vacuum at 10° C.

A suspension of 40 g. of the recrystallized Compound I in 400 ml. methylene chloride was agitated while 0.21 g. triethylamine was added to initiate polymerization. The conversion rate and the degree of polymerization were measured in the polymerized material after five hours by the methods described with reference to Tables I and II. All polymer solutions produced were completely transparent, had a filterability as good as that of Run No. 1 in Tables I and II, produced fibers and films of good or superior quality, and had other characteristic properties as shown in Table V, which also lists the yield of the recrystallization. Where several polymers are listed with reference to the same example, they were made from the several monomers described in the example.

TABLE V

| Ex. | Recryst'd Comp'd I g. | Conversion, Percent | Degree of Polymerization | Viscosity, Poise | Spinnability, cm. |
|---|---|---|---|---|---|
| I | 44 | 95.3 | 3,200 | 160 | 60 |
| II | 45 | 96.8 | 3,000 | 120 | 75 |
| II | 45 | 95.4 | 3,500 | 150 | 55 |
| II | 43 | 94.1 | 3,200 | 130 | 60 |
| III | 45 | 94.7 | 3,600 | 150 | 65 |
| III | 44 | 95.4 | 3,200 | 140 | 50 |
| III | 42 | 96.4 | 3,300 | 150 | 70 |
| III | 45 | 95.0 | 3,000 | 110 | 65 |
| IV | 45 | 94.9 | 3,000 | 100 | 50 |
| V | 44 | 96.6 | 3,100 | 120 | 45 |
| VI | 43 | 95.8 | 3,400 | 130 | 75 |
| VII | 46 | 97.2 | 3,500 | 160 | 75 |

While the invention has been described with particular reference to specific embodiments it is not limited thereto, but is to be construed broadly and restricted solely by the scope of the appended claims.

What we claim is:

1. A process for preparing γ-methyl glutamate N-carboxy anhydride which comprises contacting γ-methyl glutamate hydrochloride contaminated with glutamic acid hydrochloride with phosgene in a liquid medium essentially consisting of aliphatic halogenated hydrocarbon having a boiling point above 70° C. until said γ-methyl glutamate hydrochloride is substantially converted to γ-methyl glutamate N-carboxyanhydride; separating the reaction mixture so obtained into solid and liquid constituents, whereby said contaminant is substantially completely separated as a solid from a residual liquid containing said γ-methyl glutamate N-carboxy anhydride; and recovering the γ-methyl glutamate N-carboxy anhydride from said residual liquid.

2. A process as set forth in claim 1, wherein said hydrocarbon is chlorinated.

3. A process as set forth in claim 2, wherein the temperature of said medium is between 70° C. and 90° C. and not substantially higher than the boiling temperature of said medium, and the reaction mixture is separated into said constituents by filtering.

4. A process as set forth in claim 3, wherein said chlorinated hydrocarbon is selected from the group consisting of 1,2-dichloroethane, trichloroethylene, 1,1,2-trichloroethane, tetrachloroethylene, tetrachloroethane, pentachloroethane, 1,2-dichloropropane and 1,3-dichloropropane.

5. A process as set forth in claim 3, wherein said chlorinated hydrocarbon is 1,2-dichloroethane and the temperature of said medium is between 70° C. and 80° C.

6. A process as set forth in claim 3, wherein said chlorinated hydrocarbon is 1,2-dichloropropane and the temperature of said medium is between 75° C. and 85° C.

7. A process as set forth in claim 3, wherein said chlorinated hydrocarbon is tetrachloroethane and the temperature of said medium is between 80° C. and 90° C.

8. A process as set forth in claim 3, wherein said phosgene and said compound are contacted in substantially equimolecular amounts.

9. A process as set forth in claim 3, wherein said contaminant is present in said medium in a weight ratio between 0.3:99.7 and 10:90 with respect to said compound.

10. A process as set forth in claim 1, wherein said medium is at a temperature between 60° C. and 95° C.

11. A process as set forth in claim 1, wherein said halogenated hydrocarbon is selected from the group consisting of 1,2-dichloroethane, trichloroethylene, 1,1,2-trichloroethane, tetrachloroethylene, tetrachloroethane, pentachloroethane, 1,2-dichloropropane and 1,3-dichloropropane.

12. A process as set forth in claim 1, wherein said γ-methyl glutamate N-carboxy anhydride is prepared by esterifying glutamic acid in an esterification mixture with methanol in the presence of hydrochloric acid until most of said glutamic acid is converted to γ-methyl glutamate hydrochloride, some glutamic acid is converted to dimethylglutamate, and between 0.3 and 10% of the glutamic acid remains unreacted; said halogenated hydrocarbon being thereafter added to said mixture; and water and methanol being evaporated from the mixture so obtained prior to said contacting of the γ-methyl glutamate hydrochloride with said phosgene.

13. In a process of preparing γ-methyl glutamate N-carboxyanhydride by reaction of γ-methyl glutamate hydrochloride with phosgene, the γ-methyl glutamate hydrochloride being contaminated with glutamic acid hydrochloride, the improvement which comprises reacting said γ-methyl glutamate hydrochloride with said phosgene in a liquid medium essentially consisting of aliphatic halogenated hydrocarbon having a boiling point above 70° C., whereby a reaction between said glutamic acid hydrochloride and said phosgene is substantially prevented.

References Cited
UNITED STATES PATENTS

| | | | |
|---|---|---|---|
| 3,184,469 | 5/1965 | Ishizuka et al. | 260—307.2 |
| 3,277,156 | 10/1966 | Ishizuka et al. | 260—482 |

ALEX MAZEL, *Primary Examiner.*

NICHOLAS S. RIZZO, *Examiner.*

R. GALLAGHER, *Assistant Examiner.*